(12) United States Patent
Ma et al.

(10) Patent No.: US 12,223,932 B2
(45) Date of Patent: Feb. 11, 2025

(54) HARMONY PROCESSING METHOD AND APPARATUS, DEVICE, AND MEDIUM

(71) Applicant: Beijing Zitiao Network Technology Co., Ltd., Beijing (CN)

(72) Inventors: Ye Ma, Beijing (CN); Xuzhou Ye, Beijing (CN); Wenwu Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/537,503

(22) Filed: Dec. 12, 2023

(65) Prior Publication Data

US 2024/0112654 A1   Apr. 4, 2024

Related U.S. Application Data

(63) Continuation of application No. PCT/CN2022/117265, filed on Sep. 6, 2022.

(30) Foreign Application Priority Data

Sep. 6, 2021   (CN) .......................... 202111038854.5

(51) Int. Cl.
G10H 1/00   (2006.01)
(52) U.S. Cl.
CPC ..... *G10H 1/0025* (2013.01); *G10H 2210/056* (2013.01); *G10H 2210/136* (2013.01); *G10H 2210/265* (2013.01); *G10H 2220/021* (2013.01)

(58) Field of Classification Search
CPC .............. G10H 1/38; G10H 2210/576; G10H 2210/111; G10H 2210/125; G10H 1/36;
(Continued)

(56) References Cited

U.S. PATENT DOCUMENTS

| | | | | |
|---|---|---|---|---|
| 2009/0064851 A1* | 3/2009 | Morris | ..................... | G10H 1/36 84/637 |
| 2011/0203444 A1* | 8/2011 | Yamauchi | ................ | G10H 1/10 84/622 |

(Continued)

FOREIGN PATENT DOCUMENTS

| | | |
|---|---|---|
| CN | 1164733 A | 11/1997 |
| CN | 1547188 A | 11/2004 |

(Continued)

OTHER PUBLICATIONS

Extended European Search Report for European Patent Application No. 22863670.0, mailed on Sep. 5, 2024, 13 pages.

(Continued)

*Primary Examiner* — Marlon T Fletcher
(74) *Attorney, Agent, or Firm* — Astute IP Law Group

(57) ABSTRACT

Embodiments of the present disclosure provide a harmony processing method and apparatus, a device, and a medium, and the method includes: acquiring a harmonic interval corresponding to a target harmony control in response to a triggering operation on the target harmony control; performing, according to the harmonic interval, sound modification processing on a first sound input originally to obtain a second sound, in which an interval between the first sound and the second sound is the harmonic interval; and generating a target audio according to the first sound and the second sound, wherein the first sound and the second sound are presented as different harmonic parts in the target audio.

20 Claims, 9 Drawing Sheets

---

Acquiring a harmonic interval corresponding to a target harmony control in response to a triggering operation on the target harmony control; — 101

Performing, according to the harmonic interval, sound modification processing on a first sound input originally to obtain a second sound; — 102

Generating a target audio according to the first sound and the second sound, in which the first sound and the second sound are presented as different harmonic parts in the target audio. — 103

(58) Field of Classification Search
CPC ....... G10H 2240/131; G10H 2210/145; G10H 2220/106; G10H 2210/105; G10H 2220/126; G10H 1/46; G10H 2210/021; G10H 2240/325
See application file for complete search history.

(56) References Cited

U.S. PATENT DOCUMENTS

| | | | | |
|---|---|---|---|---|
| 2012/0234158 | A1* | 9/2012 | Chan | G10L 13/0335 |
| | | | | 84/622 |
| 2012/0297958 | A1* | 11/2012 | Rassool | G10H 1/0025 |
| | | | | 84/609 |
| 2014/0018947 | A1* | 1/2014 | Ales | G11B 27/28 |
| | | | | 700/94 |
| 2014/0053711 | A1 | 2/2014 | Serletic, II et al. | |
| 2017/0090860 | A1 | 3/2017 | Gehring et al. | |
| 2019/0139437 | A1 | 5/2019 | Goren et al. | |
| 2019/0287502 | A1* | 9/2019 | Kiely | G10H 1/38 |
| 2022/0319478 | A1* | 10/2022 | Lyske | G10H 1/0025 |
| 2022/0319479 | A1* | 10/2022 | Lyske | G10H 1/0025 |

FOREIGN PATENT DOCUMENTS

| | | | | | |
|---|---|---|---|---|---|
| CN | 1269103 | C | | 8/2006 | |
| CN | 105161087 | A | | 12/2015 | |
| CN | 110075518 | A | | 8/2019 | |
| CN | 110505496 | A | | 11/2019 | |
| CN | 110876098 | A | | 3/2020 | |
| CN | 111767740 | A | | 10/2020 | |
| CN | 112289300 | A | | 1/2021 | |
| CN | 112423009 | A | | 2/2021 | |
| CN | 113318432 | A | | 8/2021 | |
| EP | 1065651 | B1 | | 3/2016 | |
| EP | 4068273 | A2 | * | 10/2022 | ........... G10H 1/0025 |
| JP | H08166780 | A | | 6/1996 | |
| JP | H08292774 | A | | 11/1996 | |
| JP | H10143172 | A | | 5/1998 | |
| JP | 2019164316 | A | | 9/2019 | |
| WO | WO-9938152 | A1 | * | 7/1999 | ........... G10H 1/0033 |
| WO | WO-9942990 | A1 | * | 8/1999 | ............... G10H 1/00 |
| WO | WO-2004111996 | A1 | * | 12/2004 | ............. G10L 25/78 |
| WO | WO-2007073098 | A1 | * | 6/2007 | ........... G10H 1/0025 |
| WO | WO-2013021896 | A1 | * | 2/2013 | ............. G10H 1/366 |
| WO | WO-2021176102 | A1 | * | 9/2021 | ............. G06F 1/165 |
| WO | WO-2023030536 | A1 | * | 3/2023 | ............... G06F 3/16 |

OTHER PUBLICATIONS

Office Action for Chinese Patent Application No. 202111038854.5, mailed on Oct. 16, 2024, 12 pages.
Office Action for Japanese Patent Application No. 2023-577116, mailed on Dec. 10, 2024, 8 pages.

* cited by examiner

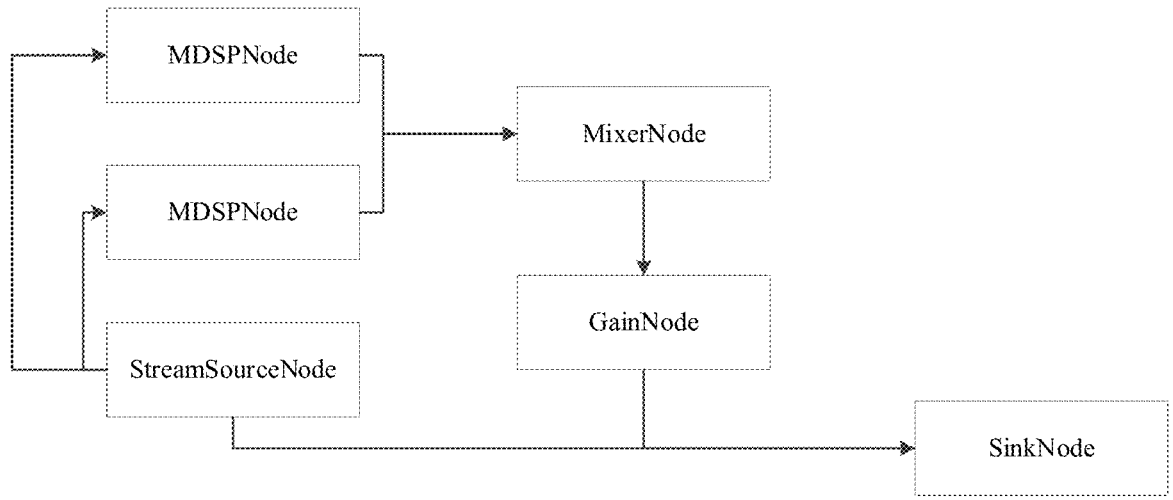

FIG. 5

- 601 Determining a target chord type interval set corresponding to the target harmony control in response to the triggering operation on the target harmony control;
- 602 Querying a preset correspondence between control identifiers and notes in the target chord type interval set, to acquire a target note corresponding to a control identifier of the target harmony control;
- 603 Querying the target chord type interval set, to acquire a harmony note corresponding to the target note;
- 604 Determining the harmonic interval corresponding to the target harmony control according to a note change between the target note and the harmony note.

FIG. 6

Harmony Control
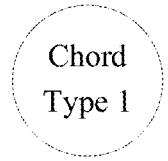
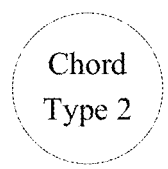
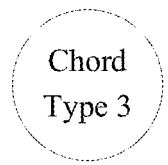
FIG. 7 (a)
Prompt Information Harmony Control
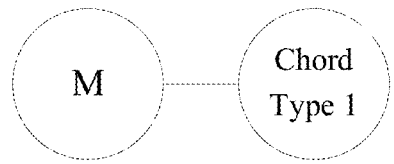
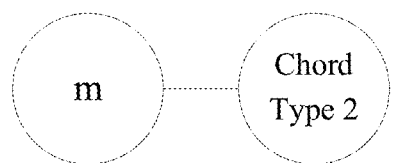
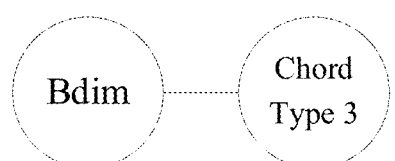
FIG. 7 (b)

HARMONY PROCESSING METHOD AND APPARATUS, DEVICE, AND MEDIUM

CROSS-REFERENCE TO RELATED APPLICATION

This application is a continuation of International Application No. PCT/CN2022/117265 filed on Sep. 6, 2022, which claims the priority to and benefits of Chinese Patent Application No. 202111038854.5, filed on Sep. 6, 2021. All the aforementioned patent applications are hereby incorporated by reference in their entireties.

TECHNICAL FIELD

The present disclosure relates to the field of computer application technology and, in particular, to a harmony processing method and apparatus, a device, and a medium.

BACKGROUND

With the development of computer technologies, there are numerous computer applications to improve human-computer interaction, and it is relatively common to improve the sense of human-computer interaction in the dimension of sound.

In the related technology, a human-computer interaction service in the dimension of sound is realized by integrating audio data in a physical control. To be specific, corresponding audio data is set in the physical control in an integrated manner, and when triggering of the corresponding physical control by the user is sensed, the corresponding audio data is played to interact with the triggering operation of the user.

However, the above-mentioned human-computer interaction service in the dimension of sound not only requires integrated setting of the audio data and the physical control, which is costly, but also has a limited amount of audio data, which leads to lack of diversity and lack of fun in interactive sound play.

SUMMARY

In order to solve the above-mentioned technical problems or at least partially solve the above-mentioned technical problems, the present disclosure provides a harmony processing method and apparatus, a device, and a medium, to solve the problems of a high cost of human-computer interaction and poor human-computer interaction experience in the dimension of sound in the prior art.

Embodiments of the present disclosure provide a harmony processing method, and the method includes: acquiring a harmonic interval corresponding to a target harmony control in response to a triggering operation on the target harmony control; performing, according to the harmonic interval, sound modification processing on a first sound input originally to obtain a second sound, in which an interval between the first sound and the second sound is the harmonic interval; and generating a target audio according to the first sound and the second sound, in which the first sound and the second sound are presented as different harmonic parts in the target audio.

The embodiments of the present disclosure further provide a harmony processing apparatus, and the apparatus includes: a first acquiring module, configured to acquire a harmonic interval corresponding to a target harmony control in response to a triggering operation on the target harmony control; a second acquiring module, configured to perform, according to the harmonic interval, sound modification processing on a first sound input originally to obtain a second sound, in which an interval between the first sound and the second sound is the harmonic interval; and an audio generation module, configured to generate a target audio according to the first sound and the second sound, in which the first sound and the second sound are presented as different harmonic parts in the target audio.

The embodiments of the present disclosure further provide an electronic device, and the electronic device includes: a processor; and a memory, configured to store instructions that can be executed by the processor; and the processor is configured to read the instructions from the memory, and execute the instructions to implement the harmony processing method provided by the embodiments of the present disclosure.

The embodiments of the present disclosure further provide a computer-readable storage medium, storing a computer program, and the computer program is used to perform the harmony processing method provided by the embodiments of the present disclosure.

The technical solutions provided by the embodiments of the present disclosure have the following advantages compared with the prior art. In the harmony processing solution provided by the embodiments of the present disclosure, a harmonic interval corresponding to a target harmony control is acquired in response to a triggering operation on the target harmony control, and sound modification processing is performed, according to the harmonic interval, on a first sound input originally to obtain a second sound; an interval between the first sound and the sound is the harmonic interval; and then a target audio is generated according to the first sound and the second sound, and the first sound and the second sound are presented as different harmonic parts in the target audio. As a result, based on the triggering of the harmony control, different harmony sounds are realized according to corresponding harmonic intervals, so that the sense of human-computer interaction is improved, the cost of harmony addition is reduced, the diversity of sound play is enriched, and the fun of sound play is improved. In addition, addition of the harmony effect based on the played original first sound improves smoothness and naturalness of harmony addition.

BRIEF DESCRIPTION OF DRAWINGS

FIG. 5 is a schematic diagram of harmony processing logical nodes provided by at least one embodiment of the present disclosure;

FIG. 6 is a schematic flowchart of another harmony processing method provided by at least one embodiment of the present disclosure;

FIG. 7(a) is a schematic diagram of another display interface of harmony controls provided by at least one embodiment of the present disclosure;

FIG. 7(b) is a schematic diagram of another display interface of harmony controls provided by at least one embodiment of the present disclosure;

DETAILED DESCRIPTION

Figure 1:
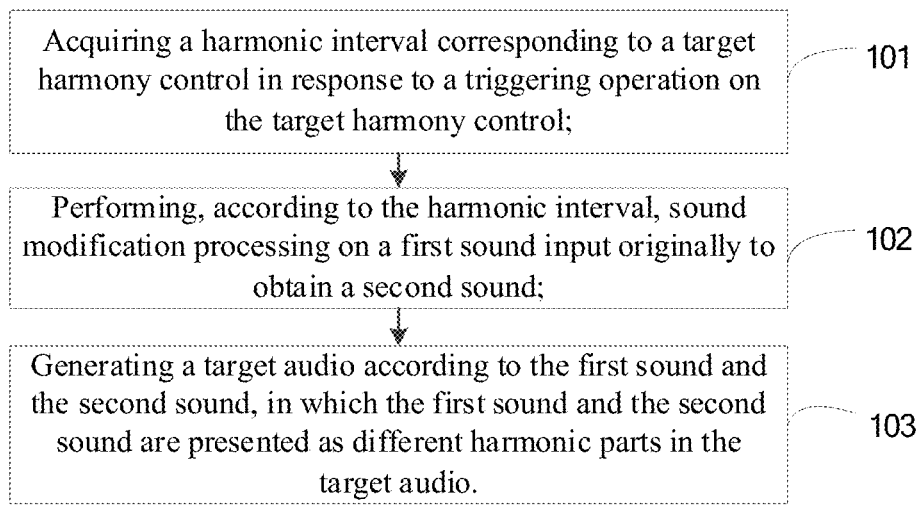
FIG. 1 is a schematic flowchart of a harmony processing method provided by at least one embodiment of the present disclosure.

Embodiments of the present disclosure will be described in more detail below with reference to the drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

Names of messages or information exchanged between a plurality of apparatuses in the embodiments of the present disclosure are only used for illustrative purposes and are not intended to limit the scope of these messages or information.

In order to solve the above-mentioned problems, the embodiments of the present disclosure provide a harmony processing method. In the method, a flexible and changeable harmony addition effect is achieved, and a harmony is added in fusion with an originally input sound (for example, human voice) and the like, so that the fused sound sounds more natural and is more interesting.

The following describes the method with reference to specific embodiments.

FIG. 1 is a schematic flowchart of a harmony processing method provided by at least one embodiment of the present disclosure, the method may be performed by a harmony processing apparatus. For example, the apparatus may be implemented by software and/or hardware, and may be usually integrated in an electronic device. As shown in FIG. 1, the method includes the following steps.

Step 101: acquiring a harmonic interval corresponding to a target harmony control in response to a triggering operation on the target harmony control.

In the present embodiment, the target harmony control may be a virtual control or a physical control, which is not limited herein. In addition, the harmonic interval refers to correlation between steps in pitch, there may be one or more groups of harmonic intervals, and there may be one or more harmonic intervals in each group of harmonic intervals. In the case where there are a plurality of groups of harmonic intervals, a plurality of corresponding harmony sounds can be implemented. The harmonic interval may include a scale variation value, a semitone number variation value, a note variation value, chord audio data, and the like.

In the present embodiment, the method further includes: presetting a plurality of harmony controls, in which the plurality of harmony controls correspond to different harmonic intervals; and displaying indication information of different harmony effects on the plurality of harmony controls.

In the embodiments of the present disclosure, a plurality of harmony controls may be preset, and the plurality of harmony controls correspond to different harmonic intervals, so that different harmonic intervals can be implemented based on triggering of different harmony controls, thereby achieving diversified harmony effects based on the different harmonic intervals.

Figure 2:
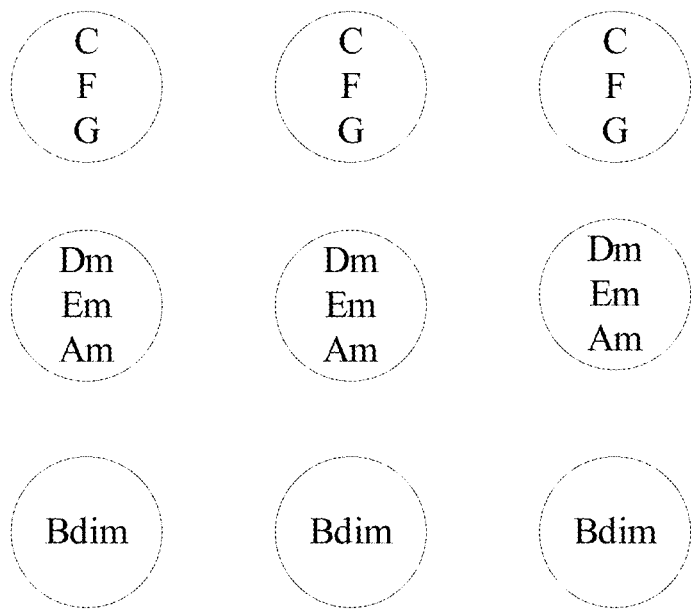
FIG. 2 is a schematic diagram of a display interface of harmony controls provided by at least one embodiment of the present disclosure.

In some possible embodiments, as shown in FIG. 2, in the case where the harmony controls are nine virtual controls, the nine virtual controls may be directly displayed on a related interface. Indication information of different harmony effects (for example, Dm, Em, and Am in the figure) may be displayed on different harmony controls, so that a user may trigger a corresponding target harmony control according to the indication information. In the present embodiment, in addition to the above-mentioned chord English letters, the indication information may also be style description information such as "bright", "dim", or "tense", or may be color filling information of the virtual controls.

Step 102: performing, according to the harmonic interval, sound modification processing on a first sound input originally to obtain a second sound.

An interval between the first sound and the second sound is the harmonic interval.

The originally input first sound in the present embodiment may be music play data, speech input vocal data, or the like in related applications, which is not limited herein. The interval between the first sound and the second sound is the harmonic interval, so that a chord sound effect is achieved.

In the present embodiment, the originally input first sound is processed according to the harmonic interval. Because the harmonic interval is used to achieve a harmony effect, the second sound that forms the harmonic interval with the first sound can be acquired based on the harmonic interval.

For example, in the case where the harmonic interval includes a plurality of semitone number variation values, a plurality of changes and adjustments may be performed on a semitone number of the first sound, to obtain the corresponding second sound in another harmonic part. In this way, the second sound that forms the harmonic interval with the first sound is acquired.

It should be noted that, in some possible embodiments, the second sound may be acquired through a part. In the present embodiment, an object whose harmonic part is changed is the first sound. Therefore, the second sound is acquired based on the originally input first sound, instead of adding a new harmony audio that has no correlation with the first sound, which will enhance the correlation between the second sound and the first sound, and further ensure naturalness and smoothness of the fused sound.

Figure 3:
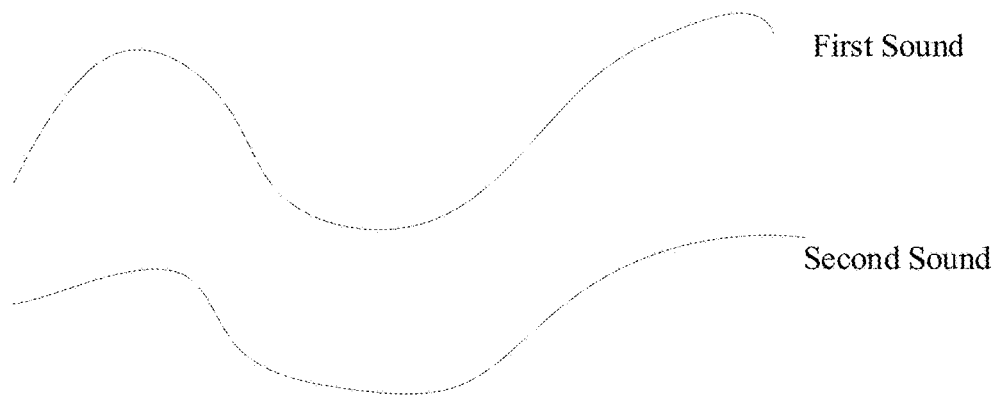
FIG. 3 is a schematic diagram of a harmony processing scenario provided by at least one embodiment of the present disclosure.

For example, as shown in FIG. 3, in the case where a curve is used to represent a part direction of a corresponding sound, if harmonic intervals corresponding to notes of the first sound are all the same, when a part direction of the first sound is the upper curve in the figure, a part direction of the second sound obtained by processing the first sound has a correlation with the part direction of the first sound, so that the effect that the second sound is derived from the original sound source of the first sound is achieved. It should be noted that, during actual application, the part direction of the second sound does not have a strict linear correspondence with the part direction of the first sound, and the figure is only a possible example and cannot be regarded as a limitation on the embodiments of the present disclosure.

Step 103: generating a target audio according to the first sound and the second sound, in which the first sound and the second sound are presented as different harmonic parts in the target audio.

Figure 4:
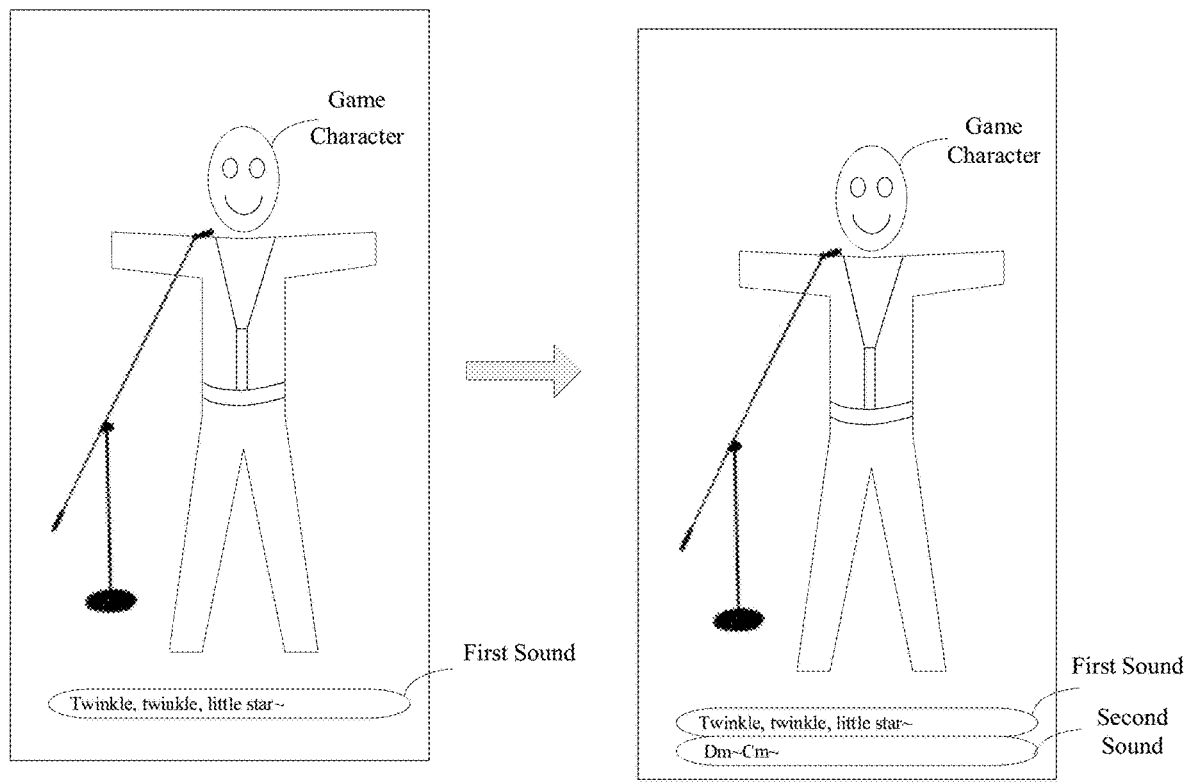
FIG. 4 is a schematic diagram of another harmony processing scenario provided by at least one embodiment of the present disclosure.

In the present embodiment, the first sound and the second sound are mixed, so that parts of the first sound are enriched, and a harmonic play effect is achieved. In addition, because the second sound is obtained by processing the first sound, there is no need to separately record and store the second sound, so that the cost of harmony addition is reduced. For example, in an audio play application, as shown in FIG. 4, a corresponding game character may be singing, and a user hears an originally input sound of a song "Little Star", for example, the sound may be recorded by a user in advance, or the like; and after the harmony processing in the present embodiment, not only the originally input sound of the song "Little Star" is simply played, but actually, what the user hears is the harmony effect sound of the song "Little Star".

In order to facilitate the person skilled in the art in understanding the harmony processing method in the embodiments of the present disclosure, an execution logic of harmony processing of the embodiments of the present disclosure is described below in the form of functional module nodes.

In the present embodiment, as shown in FIG. 5, the originally input first sound is acquired by a StreamSourceNode node. Based on the first sound, the originally input first sound is processed by an MDSPNode node, in which processing the originally input first sound by the MDSPNode node is determined according to the harmonic interval corresponding to the triggered target harmony control. In the present embodiment, each MDSPNode node corresponds to a group of harmonic intervals, and two groups of harmonic intervals are shown in the figure. Then, a MixerNode mixer node mixes changed sounds obtained by processing the two groups of harmonic intervals, to obtain the second sound. The second sound is input to a corresponding GainNode volume control node. The second sound is output when the GainNode volume control node is 1. The second sound is not output when the GainNode volume control node is 0. The value of the GainNode volume control node is related to whether the user currently triggers the target harmony control. If the user currently triggers the target harmony control, the value of the corresponding GainNode volume control node is 1, or otherwise, the value of the GainNode volume control node is 0.

Further, if the GainNode volume control node outputs the second sound, the first sound and the second sound are mixed by a SinkNode play node for play.

In conclusion, according to the harmony processing method in the embodiments of the present disclosure, a harmonic interval corresponding to a target harmony control is acquired in response to a triggering operation on the target harmony control, and sound modification processing is performed, according to the harmonic interval, on a first sound input originally to obtain a second sound; an interval between the first sound and the sound is the harmonic interval; and then a target audio is generated according to the first sound and the second sound, and the first sound and the second sound are presented as different harmonic parts in the target audio. As a result, based on the triggering of the harmony control, different harmony sounds are realized according to corresponding harmonic intervals, so that the sense of human-computer interaction is improved, the cost of harmony addition is reduced, the diversity of sound play is enriched, and the fun of sound play is improved. In addition, addition of the harmony effect based on the played original first sound improves smoothness and naturalness of harmony addition.

During actual execution, because the harmonic interval will directly determine the harmony effect, it is crucial to determine the harmonic interval.

It should be noted that, in different application scenarios, there are different manners of acquiring the harmonic interval corresponding to the target harmony control in response to the triggering operation on the target harmony control. Examples are as follows.

In an embodiment of the present disclosure, harmonic intervals and harmony controls are stored in the form of a correspondence. During specific storage, a control identifier corresponding to a harmony control may be acquired. The control identifier may be any information that can be used to uniquely determine a corresponding harmony control, such as a control color, control indication information, or a control position. In the present embodiment, a preset correspondence between control identifiers and harmonic intervals is queried to acquire a harmonic interval corresponding to a control identifier of the target harmony control, in response to the triggering operation on the target harmony control.

In another embodiment of the present disclosure, as shown in FIG. 6, acquiring the harmonic interval corresponding to the target harmony control in response to the triggering operation on the target harmony control includes the following steps.

Step 601: determining a target chord type interval set corresponding to the target harmony control in response to the triggering operation on the target harmony control.

Figure 8:
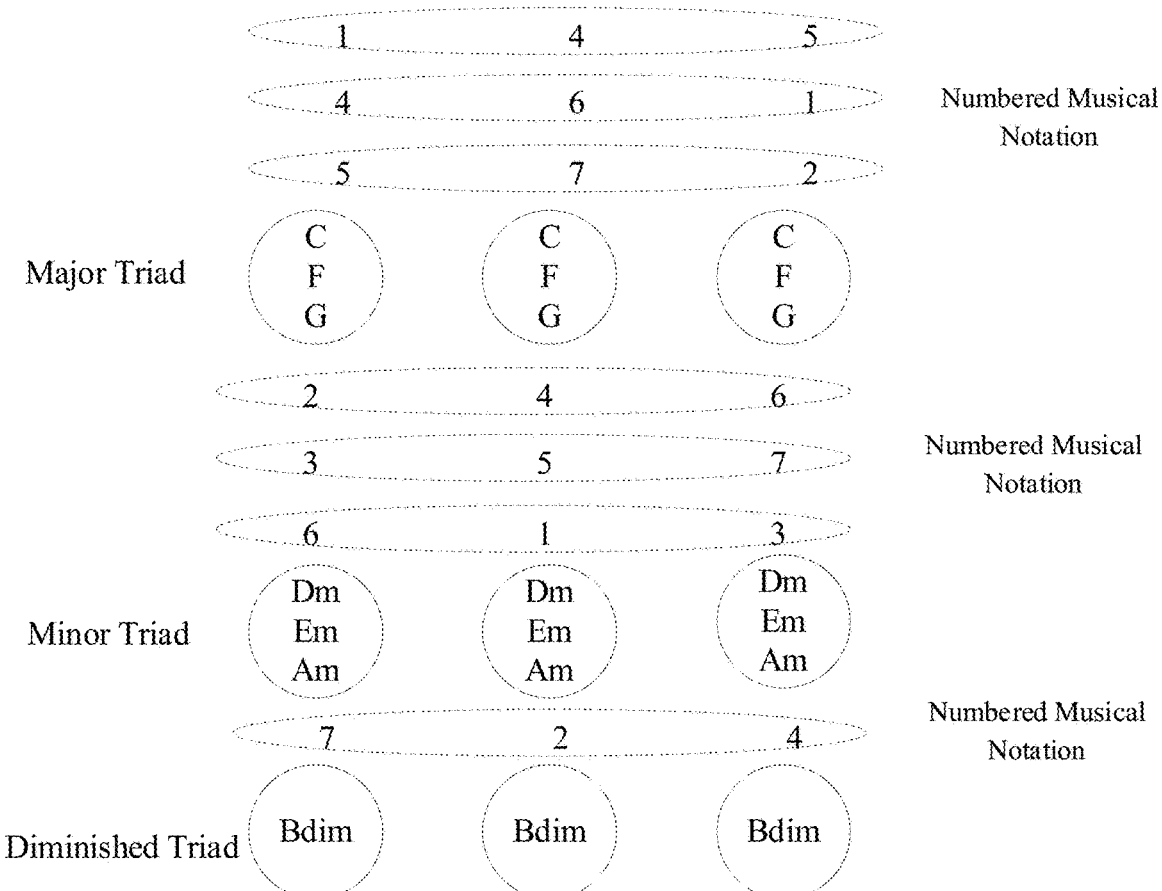
FIG. 8(a) is a schematic diagram of another display interface of harmony controls provided by at least one embodiment of the present disclosure.
FIG. 8(b) is a schematic diagram of a correspondence between notes and numbered musical notations provided by at least one embodiment of the present disclosure.
Figure 8:
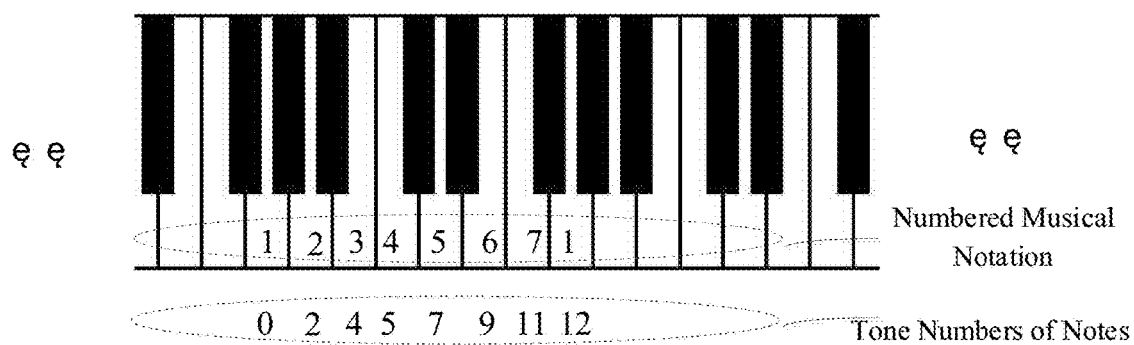

In the present embodiment, a harmony control corresponds to a chord type interval set. As shown in FIG. 8(a), chord types include a bright-colored major triad including numbered musical notations such as "135", "461", and "572", a dim-colored minor triad including numbered musical notations such as "246", "357", and "613", a tense-colored diminished triad including numbered musical notations such as "724", and the like. The chord type interval set is a list including note numbers corresponding to numbered musical notations of the above-mentioned chord types. It should be noted that, the numbered musical notations and the corresponding chord types in the figure are merely a possible example provided for ease of understanding of the embodiments of the present disclosure, and cannot be regarded as a limitation on the embodiments of the present disclosure.

Therefore, in some possible embodiments, a preset correspondence between the control identifiers and chord types may be queried to determine the target chord type interval set corresponding to the control identifier of the target harmony control, in response to the triggering operation on the target harmony control.

In the present embodiment, as shown in FIG. 7(a), there may be only one displayed sound control corresponding to a same chord type, and each sound control corresponds to one chord type.

In some other possible embodiments, in order to improve intuitiveness of selection, a chord type control associated with the target harmony control may be started to send corresponding prompt information, in response to the triggering operation on the target harmony control. The prompt information may be any form of information indicating the chord type. For example, as shown in FIG. 7(b), the chord type control associated with the target harmony control is started to send the corresponding prompt information: English letters of the corresponding chord. For example, the corresponding prompt information is sent to a related server, and then a chord type interval set corresponding to a control identifier of the chord type control is determined as the target chord type interval set according to the prompt information.

In the present embodiment, the harmony control corresponds to the chord type interval set. As shown in FIG. 8(a), different harmony controls may correspond to a same chord type interval set. For example, the major triad type interval set in FIG. 8(a) corresponds to the three harmony controls in the first row.

Step 602: querying a preset correspondence between control identifiers and notes in the target chord type interval set, to acquire a target note corresponding to a control identifier of the target harmony control.

Still referring to FIG. 8(a), although different harmony controls may correspond to a same chord type interval set, different harmonies correspond to different numbered musical notations of the chord type interval set, so that different numbered musical notations correspond to different notes. Therefore, in the present embodiment, a preset correspondence between control identifiers and notes in the target chord type interval set is queried, to acquire a target note corresponding to the control identifier of the target harmony control. For the control identifiers herein, reference may be made to the above-mentioned embodiments, and details are not described herein again.

In the present embodiment, notes are related to tone numbers (including semitone numbers and whole tone numbers), and tone number change laws of notes of a same chord type are the same. For example, with reference to FIG. 8(b), tone numbers corresponding to notes of the major triad numbered musical notations "135" are "0-4-7", and tone numbers corresponding to notes of the major triad numbered musical notations "461" are "5-9-12", and semitone number intervals are both 4 and 3, so that a same chord auditory effect is achieved based on the same change of tone numbers.

If a same harmony control corresponds to a plurality of notes, when a target note of the target harmony control is subsequently determined, any one of a plurality of notes corresponding to a plurality of harmony controls corresponding to a same chord type may be, based on a random algorithm, randomly selected as the target note of the triggered target harmony control.

Step 603: querying the target chord type interval set, to acquire a harmony note corresponding to the target note.

In the present embodiment, the target chord type interval set is queried to acquire the harmony note corresponding to the target note. In the present embodiment, the corresponding harmony note may be obtained through query based on a preset mapping relationship. Because one chord includes a plurality of harmony notes, another harmony note having the same chord type may also be determined as the harmony note corresponding to the target note, based on the chord type corresponding to the target harmony control.

Step 604: determining the harmonic interval corresponding to the target harmony control according to a note change between the target note and the harmony note.

In the present embodiment, the chord effect, as analyzed above, is achieved based on a change of tone numbers corresponding to different notes. Therefore, to achieve a harmony of the chord effect, in the present embodiment, the harmonic interval corresponding to the target harmony control is determined according to the note change between the target note and the harmony note, that is, the change of tone numbers.

For example, in the case where the chord type of the selected target harmony control is the minor triad, the numbered musical notations corresponding to the target harmony control are common, and a singer sings "re", the numbered musical notations "246" form the minor triad. Therefore, a change between notes corresponding to "46" and "2" is determined as the harmonic interval corresponding to the target harmony control. In the present example, because the semitone number corresponding to "2" is "2", the semitone number corresponding to "4" is "5", and the semitone number corresponding to "6" is "6", the corresponding note change is determined as "+3" and "+4". Therefore, a change of "+3" and "+4" may be performed on the tone number of the note corresponding to the first sound, to achieve the sound effect of adding the minor triad.

It should be noted that, in the present embodiment, for the same chord type, because a triggered target note corresponding to the target harmony control has a different order in the chord type interval set, different types of chord effects may be achieved. For example, for the major triad, if the first note of the major triad is triggered, the achieved chord effect is a chord effect formed by two paths of sounds obtained by performing "+4" and "+7" on the tone number of the first sound; if the second note of the major triad is triggered, the achieved chord effect is a chord effect formed by two paths of sounds obtained by performing "−4" and "+3" on the tone number of the first sound; or if the third note of the major triad is triggered, the achieved chord effect is a chord effect formed by two paths of sounds obtained by performing "−7" and "−3" on the tone number of the first sound. In this way, diversity of chord types is greatly expanded, and sound play fun is enriched.

In another embodiment of the present disclosure, a tone type of the input first sound may alternatively be recognized, and a preset database may be queried based on the tone type to acquire the corresponding harmonic interval.

In conclusion, according to the harmony processing method in the embodiments of the present disclosure, the manner of determining the harmonic interval corresponding to the target harmony control is flexibly selected according to a scenario requirement, and possibilities of the harmonic interval are expanded based on different manners of realizing the harmonic interval, so as to expand diversity of the harmony, and improve sound play fun. In addition, determining of the harmonic interval relies on the user's triggering operation on the target harmony control. In the case where the user triggers different target harmony controls, the finally achieved harmony effects are different, so that fun of human-computer interaction is improved.

Based on the above-mentioned embodiments, in order to further improve the sense of ambience of sound play, processing in other dimensions may further be used to assist in mixed play of the second sound, to improve sound play fun.

Figure 9:
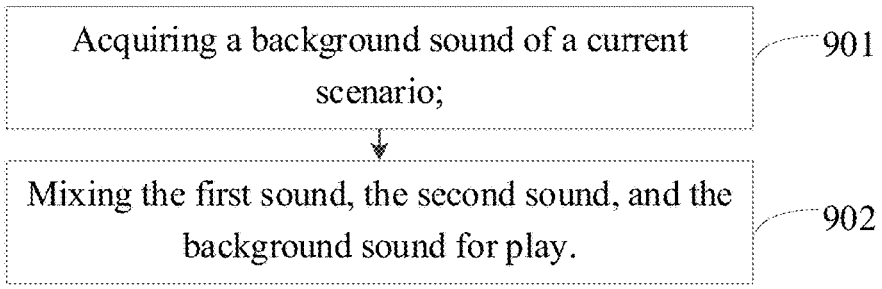
FIG. 9 is a schematic flowchart of another harmony processing method provided by at least one embodiment of the present disclosure.

In an embodiment of the present disclosure, as shown in FIG. 9, the method further includes the following steps.

Step 901: acquiring a background sound of a current scenario.

The background sound may be determined by querying a preset correspondence according to a scenario type. For example, in the case where the scenario type is a game scenario, the background sound may be electronic music, or the like. For example, the background sound may be determined according to a content type of the first sound, for example, in the case where the first sound is a children's song "Little Star", the preset database may be queried to determine that the corresponding background sound is a sound of nighttime sea breeze.

Certainly, in some possible implementations, the corresponding background sound may also be manually selected by the user on a related interface.

Step 902: mixing the first sound, the second sound, and the background sound for play.

In the present embodiment, mixing the first sound, the second sound, and the background sound for play further improves the music play effect.

Figure 10:
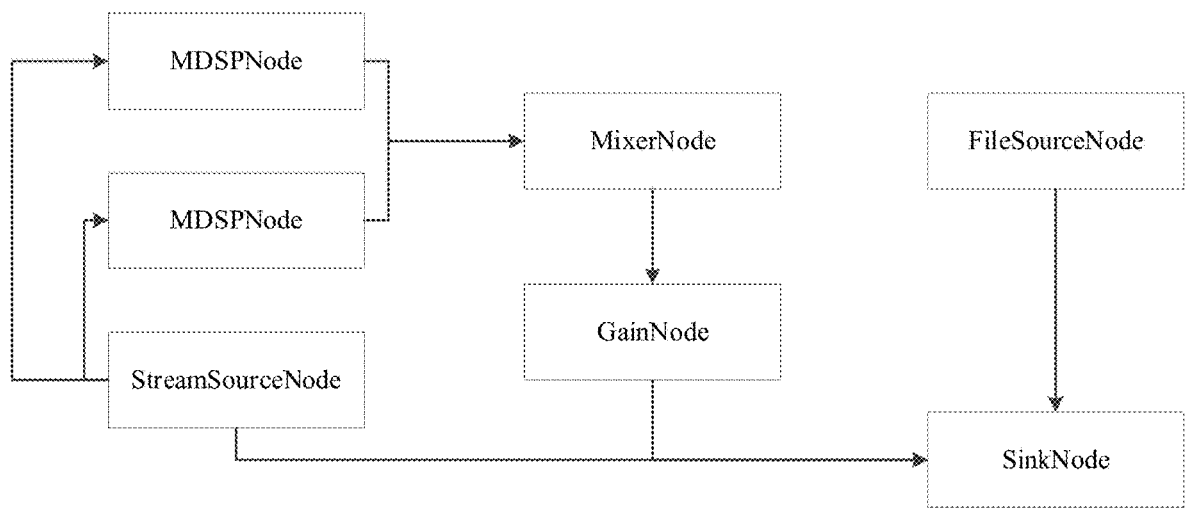
FIG. 10 is another schematic diagram of harmony processing logical nodes provided by at least one embodiment of the present disclosure.

In the execution logic, as shown in FIG. 10, the functional nodes shown in FIG. 5 may further include a FileSourceNode node, which is connected to the SinkNode play node for transmitting confirmed background music.

Figure 11:
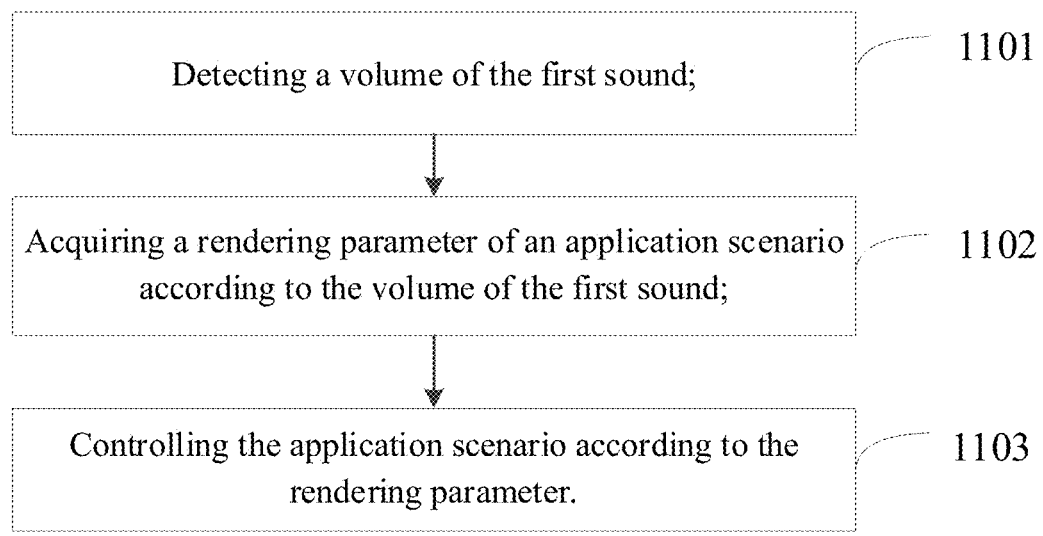
FIG. 11 is a schematic flowchart of another harmony processing method provided by at least one embodiment of the present disclosure.

In another embodiment of the present disclosure, as shown in FIG. 11, the method further includes the following steps.

Step 1101: detecting a volume of the first sound.

In the present embodiment, if the first sound is played by a related application, the volume of the corresponding first sound may be determined based on a length of a volume control bar for the application in a terminal device in which the application is located.

Step 1102: acquiring a rendering parameter of an application scenario according to the volume of the first sound.

For example, the rendering parameter includes one of color, animation, pattern, and text, or a combination of several of them. The application scenario is an application scenario corresponding to the first sound, for example, a game scenario, a music play scenario, or the like.

Step 1103: controlling the application scenario according to the rendering parameter.

In the present embodiment, the method further includes: pre-specifying a renderable region in the application scenario; and controlling the application scenario according to the rendering parameter includes: rendering in the renderable region according to the rendering parameter.

In an embodiment of the present disclosure, the renderable region in the application scenario may alternatively be pre-specified, and the rendering is performed in the renderable region according to the rendering parameter. Alternatively, a renderable target object may be determined based on a deep learning technology, and the corresponding target object may be rendered according to the rendering parameter.

Figure 12:
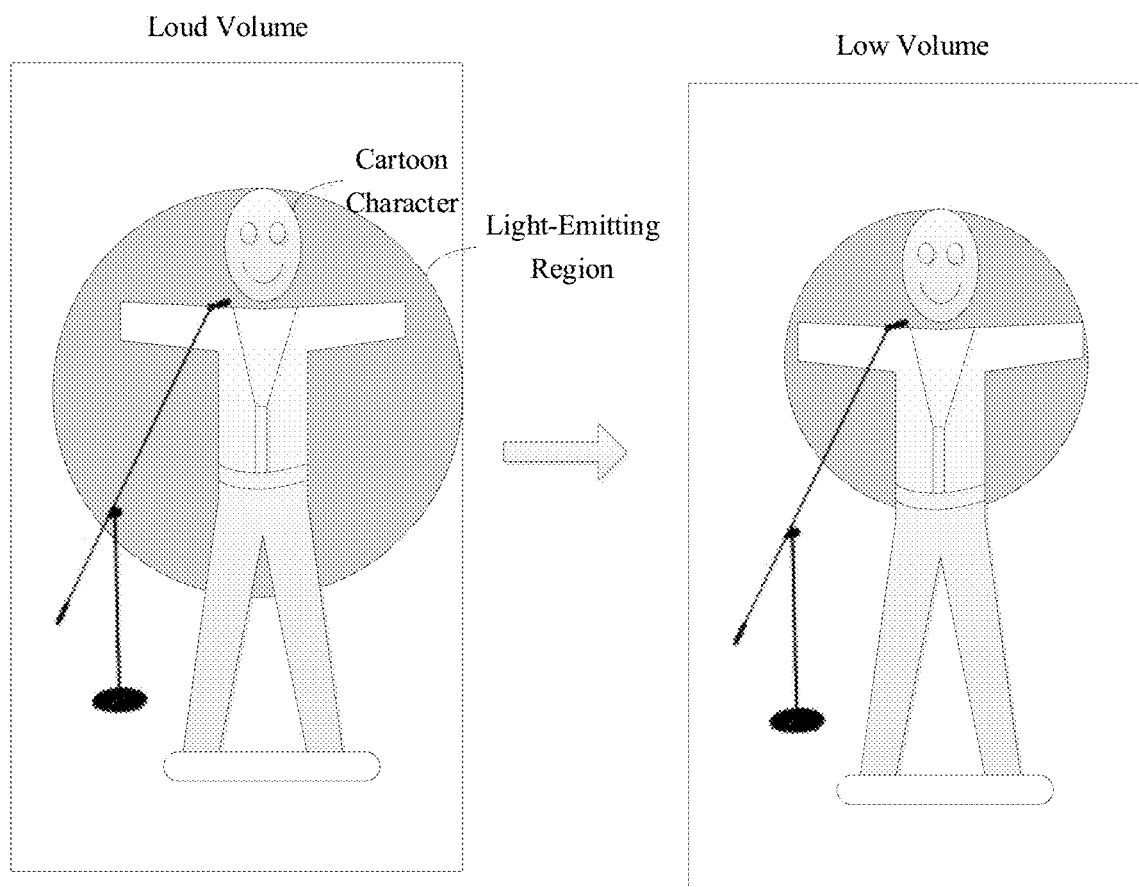
FIG. 12 is a schematic diagram of another harmony processing scenario provided by at least one embodiment of the present disclosure.

In the present embodiment, the change of the first volume is reflected based on display of the rendering parameter, so as to further improve the sound play effect. For example, as shown in FIG. 12, in the case where the application scenario is a cartoon character singing scenario, and the rendering parameter is a parameter of an area size of a light-emitting region of a background region in which a cartoon character is located, when the first sound is loud, the background region corresponding to the cartoon character displays the light-emitting region with a larger area; or when the first sound is low, the background region corresponding to the cartoon character displays the light-emitting region with a smaller area.

For another example, in the case where the application scenario is the cartoon character singing scenario, and the rendering parameter is control of a stage height on which the cartoon character is located, when the first sound is loud, the corresponding stage height of the cartoon character is higher; or when the first sound is low, the corresponding stage height of the cartoon character is lower.

Figure 13:
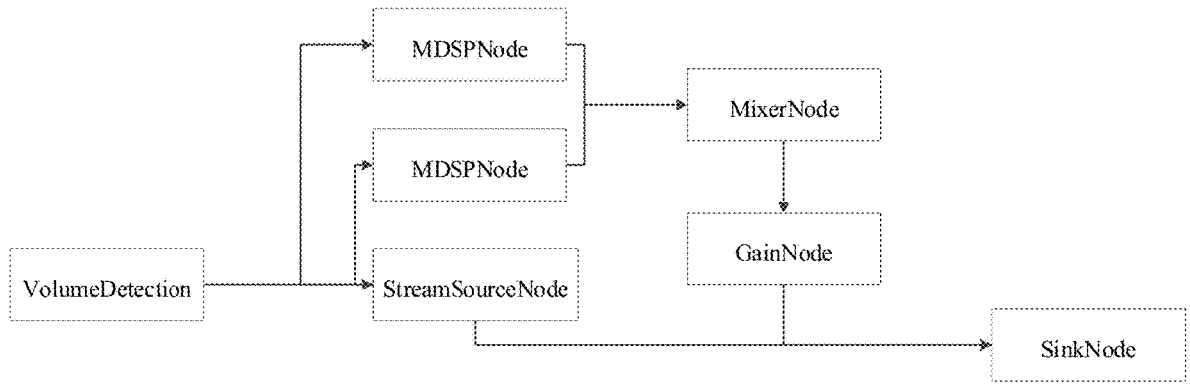
FIG. 13 is another schematic diagram of harmony processing logical nodes provided by at least one embodiment of the present disclosure.

In the execution logic, as shown in FIG. 13, the functional nodes shown in FIG. 5 may further include a VolumeDetection node, and the VolumeDetection node is connected to the StreamSourceNode node for detecting the volume of the first sound, matching the rendering parameter based on the first volume, and controlling the application scenario based on the rendering parameter.

Figure 14:
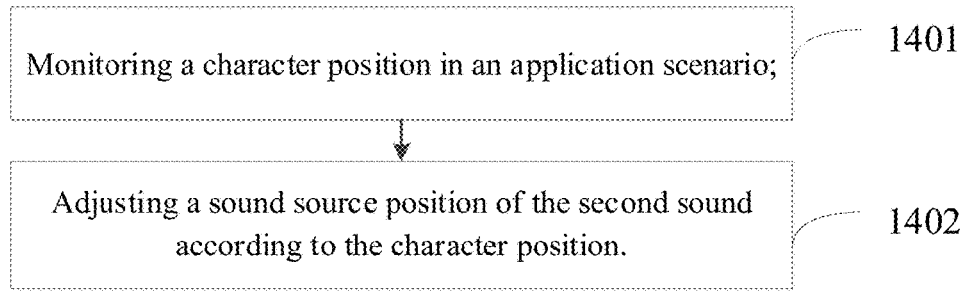
FIG. 14 is a schematic flowchart of another harmony processing method provided by at least one embodiment of the present disclosure.

In another embodiment of the present disclosure, as shown in FIG. 14, the method further includes the following steps.

Step 1401: monitoring a character position in an application scenario.

In the present embodiment, a character in the application scenario may be, as the cartoon character described above, a virtual object used to acoustically indicate an occurrence source of the first sound, and the corresponding character position may be a position of the virtual character in a video screen, or on the stage, or the like. Certainly, in a video capturing scenario, the character position may be a position of an actual capturing object in a real scenario, and the position is a position of a camera at a certain distance from the terminal device, etc.

Step 1402: adjusting a sound source position of the second sound according to the character position.

It is easy to understand that sound play effects achieved at different sound making positions are different. Therefore, in the present embodiment, the sound source position of the second sound may also be adjusted according to the character position, to achieve a stereo play effect.

In the present embodiment, adjusting the sound source position of the second sound according to the character position includes: determining sound parameter distribution conditions corresponding to different character positions according to a preset database; and adjusting a volume of the second sound according to the sound parameter distribution conditions, to adjust the sound source position of the second sound.

In some possible embodiments, the sound parameter distribution conditions (including an audio speed, an audio oscillation amplitude, a sound volume change, and the like) corresponding to different character positions may be determined according to the preset database; and the volume of the second sound is adjusted according to the sound parameter distribution conditions, to achieve the effect of adjusting the sound source position of the second sound acoustically.

Figure 15:
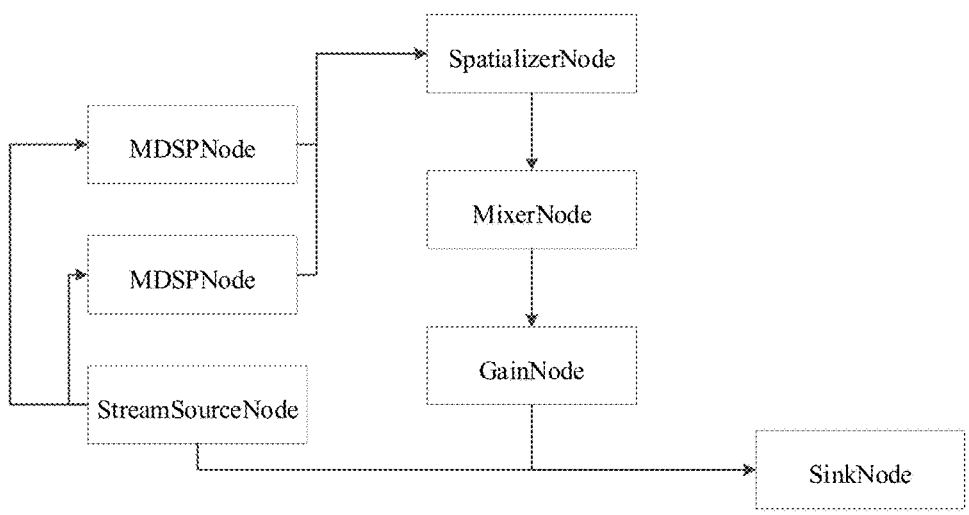
FIG. 15 is another schematic diagram of harmony processing logical nodes provided by at least one embodiment of the present disclosure.

In the execution logic, as shown in FIG. 15, the functional nodes shown in FIG. 5 may further include a SpatializerNode node. The SpatializerNode node is used to adjust the sound source position of the second sound, and input the adjusted second sound into the corresponding MixerNode mixer node, to mix the first sound and the second sound, thereby achieving a stereo play effect.

In conclusion, according to the harmony processing method in the embodiments of the present disclosure, the sound play effect obtained by mixing the second sound and the first sound is improved in different manners, to further improve harmony play fun.

To implement the above-mentioned embodiments, the present disclosure further provides a harmony processing apparatus.

Figure 16:
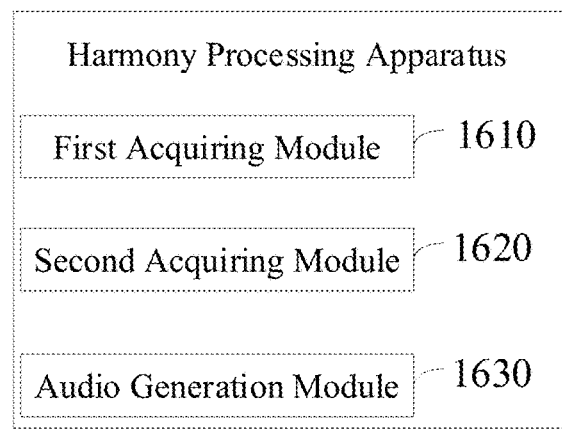
FIG. 16 is a schematic diagram of a structure of a harmony processing apparatus provided by at least one embodiment of the present disclosure.

FIG. 16 is a schematic diagram of a structure of a harmony processing apparatus provided by at least one embodiment of the present disclosure. The apparatus may be implemented by software and/or hardware, and may be usually integrated in an electronic device. As shown in FIG. 16, the apparatus includes a first acquiring module 1610, a second acquiring module 1620, and an audio generation module 1630.

The first acquiring module 1610 is configured to acquire a harmonic interval corresponding to a target harmony control in response to a triggering operation on the target harmony control.

The second acquiring module 1620 is configured to perform, according to the harmonic interval, sound modification processing on a first sound input originally to obtain a second sound, in which an interval between the first sound and the second sound is the harmonic interval.

The audio generation module 1630 is configured to generate target audio according to the first sound and the second sound, in which the first sound and the second sound are presented as different harmonic parts in the target audio.

According to one or more embodiments of the present disclosure, in the harmony processing apparatus provided by the present disclosure, the first acquiring module 1610 is specifically configured to query a preset correspondence between control identifiers and harmonic intervals to acquire a harmonic interval corresponding to a control identifier of the target harmony control, in response to the triggering operation on the target harmony control.

According to one or more embodiments of the present disclosure, in the harmony processing apparatus provided by the present disclosure, the first acquiring module 1610 is specifically configured to: determine a target chord type interval set corresponding to the target harmony control in response to the triggering operation on the target harmony control; query a preset correspondence between control identifiers and notes in the target chord type interval set, to acquire a target note corresponding to a control identifier of the target harmony control; query the target chord type interval set, to acquire a harmony note corresponding to the target note; and determine the harmonic interval corresponding to the target harmony control according to a note change between the target note and the harmony note.

According to one or more embodiments of the present disclosure, in the harmony processing apparatus provided by the present disclosure, the first acquiring module 1610 is specifically configured to query a preset correspondence between the control identifiers and chord types to determine a target chord type interval set corresponding to a control identifier of the target harmony control, in response to the triggering operation on the target harmony control.

According to one or more embodiments of the present disclosure, in the harmony processing apparatus provided by the present disclosure, the first acquiring module 1610 is specifically configured to start a chord type control associated with the target harmony control to send corresponding prompt information, in response to the triggering operation on the target harmony control; and determine, according to the prompt information, a chord type interval set corresponding to a control identifier of the chord type control as the target chord type interval set.

According to one or more embodiments of the present disclosure, the harmony processing apparatus provided by the present disclosure further includes:
 a third acquiring module, configured to acquire a background sound of a current scenario;
 and the audio generation module 1630 is further configured to mix the first sound, the second sound, and the background sound for play.

According to one or more embodiments of the present disclosure, the harmony processing apparatus provided by the present disclosure further includes:
 a detection module, configured to detect a volume of the first sound;
 a fourth acquiring module, configured to acquire a rendering parameter of an application scenario according to the volume of the first sound;
 and a control module, configured to control the application scenario according to the rendering parameter.

According to one or more embodiments of the present disclosure, the harmony processing apparatus provided by the present disclosure further includes:
 a specification module, configured to pre-specify a renderable region in the application scenario;
 and the control module is further configured to render in the renderable region according to the rendering parameter.

According to one or more embodiments of the present disclosure, the harmony processing apparatus provided by the present disclosure further includes:
 a monitoring module, configured to monitor a character position in an application scenario;
 and an adjustment module, configured to adjust a sound source position of the second sound according to the character position.

According to one or more embodiments of the present disclosure, in the harmony processing apparatus provided by the present disclosure, the adjustment module is further configured to: determine sound parameter distribution conditions corresponding to different character positions according to a preset database; and adjust a volume of the second sound according to the sound parameter distribution conditions, to adjust the sound source position of the second sound.

According to one or more embodiments of the present disclosure, the harmony processing apparatus provided by the present disclosure further includes:
 a presetting module, configured to preset a plurality of harmony controls, in which the plurality of harmony controls correspond to different harmonic intervals;
 and a display module, configured to display indication information of different harmony effects on the plurality of harmony controls.

The harmony processing apparatus provided in the embodiments of the present disclosure can perform the harmony processing method provided in any embodiment of the present disclosure, and has corresponding functional modules for performing the method and beneficial effects.

To implement the above-mentioned embodiments, the present disclosure further provides a computer program product, including a computer program/instruction, and when the computer program/instruction is executed by a processor, the harmony processing method in the above-mentioned embodiments is implemented.

Figure 17:
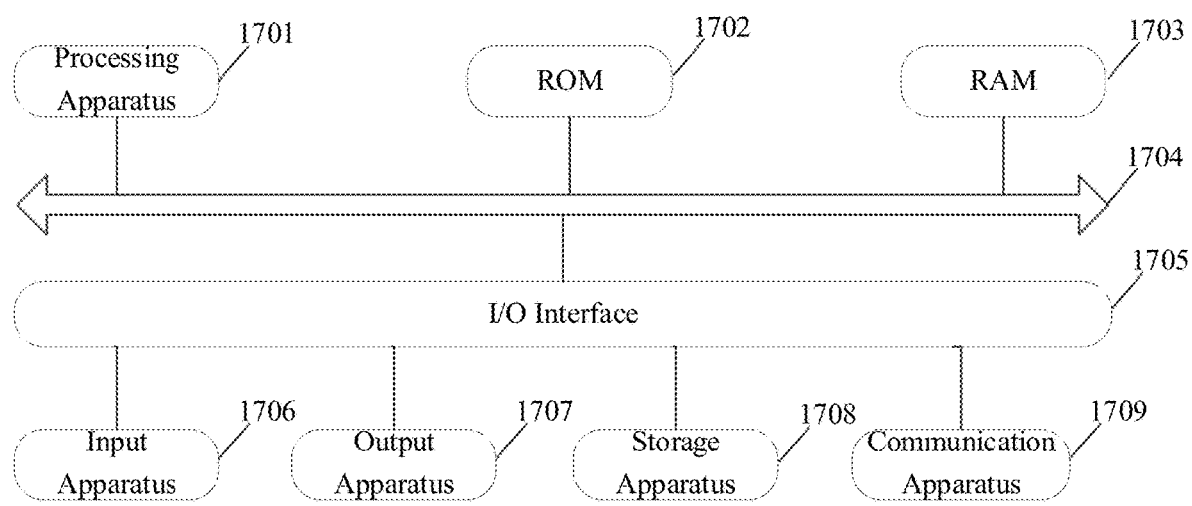
FIG. 17 is a schematic diagram of a structure of an electronic device provided by at least one embodiment of the present disclosure.

FIG. 17 is a schematic diagram of a structure of an electronic device provided by at least one embodiment of the present disclosure.

The following specifically shows a schematic diagram of a structure of an electronic device 1700 provided by at least one embodiment of the present disclosure with reference to FIG. 17. The electronic device 1700 in the embodiments of the present disclosure may include, but not limited to, a mobile terminal such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 17 is merely an example, and should not pose any limitation to the functions and the range of use of the embodiments of the present disclosure.

As shown in FIG. 17, the electronic device 1700 may include a processing apparatus 1701 (e.g., a central processing unit, a graphics processing unit, etc.), which can perform various suitable actions and processing according to a program stored in a read-only memory (ROM) 1702 or a program loaded from a storage apparatus 1708 into a random-access memory (RAM) 1703. The RAM 1703 further stores various programs and data required for operations of the electronic device 1700. The processing apparatus 1701, the ROM 1702, and the RAM 1703 are interconnected by means of a bus 1704. An input/output (I/O) interface 1705 is also connected to the bus 1704.

Usually, the following apparatuses may be connected to the I/O interface 1705: an input apparatus 1706 including, for example, a touch screen, a touch pad, a keyboard, a mouse, a camera, a microphone, an accelerometer, a gyroscope, or the like; an output apparatus 1707 including, for example, a liquid crystal display (LCD), a loudspeaker, a vibrator, or the like; a storage apparatus 1708 including, for example, a magnetic tape, a hard disk, or the like; and a communication apparatus 1709. The communication apparatus 1709 may allow the electronic device 1700 to be in wireless or wired communication with other devices to exchange data. While FIG. 17 illustrates the electronic device 1700 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 1709 and installed, or may be installed from the storage apparatus 1708, or may be installed from the ROM 1702. When the computer program is executed by the processing apparatus 1701, the above-mentioned functions defined in the harmony processing method of the embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: acquire a harmonic interval corresponding to a target harmony control in response to a triggering operation on the target harmony control; perform, according to the harmonic interval, sound modification processing on a first sound input originally to obtain a second sound, in which an interval between the first sound and the second sound is the harmonic interval; and then generate a target audio according to the first sound and the second sound, in which the first sound and the second sound are presented as different harmonic parts in the target audio. As a result, based on the triggering of the harmony control, different harmony sounds are realized according to corresponding harmonic intervals, so that the sense of human-computer interaction is improved, the cost of harmony addition is reduced, the diversity of sound play is enriched, and the fun of sound play is improved. In addition, addition of the harmony effect based on the played original first sound improves smoothness and naturalness of harmony addition.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus, or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, the present disclosure provides a harmony processing method, including:
  acquiring a harmonic interval corresponding to a target harmony control in response to a triggering operation on the target harmony control;
  performing, according to the harmonic interval, sound modification processing on a first sound input originally to obtain a second sound, in which an interval between the first sound and the second sound is the harmonic interval;
  and generating a target audio according to the first sound and the second sound, in which the first sound and the second sound are presented as different harmonic parts in the target audio.

According to one or more embodiments of the present disclosure, in the harmony processing method provided by the present disclosure, acquiring a harmonic interval corresponding to a target harmony control in response to a triggering operation on the target harmony control includes:
  querying a preset correspondence between control identifiers and harmonic intervals to acquire a harmonic interval corresponding to a control identifier of the target harmony control, in response to the triggering operation on the target harmony control.

According to one or more embodiments of the present disclosure, in the harmony processing method provided by the present disclosure, acquiring a harmonic interval corresponding to a target harmony control in response to a triggering operation on the target harmony control includes:
  determining a target chord type interval set corresponding to the target harmony control in response to the triggering operation on the target harmony control;

querying a preset correspondence between control identifiers and notes in the target chord type interval set, to acquire a target note corresponding to a control identifier of the target harmony control;

querying the target chord type interval set, to acquire a harmony note corresponding to the target note;

and determining the harmonic interval corresponding to the target harmony control according to a note change between the target note and the harmony note.

According to one or more embodiments of the present disclosure, in the harmony processing method provided by the present disclosure, determining a target chord type interval set corresponding to the target harmony control in response to the triggering operation on the target harmony control includes:

querying a preset correspondence between the control identifiers and chord types to determine a target chord type interval set corresponding to a control identifier of the target harmony control, in response to the triggering operation on the target harmony control.

According to one or more embodiments of the present disclosure, in the harmony processing method provided by the present disclosure, determining a target chord type interval set corresponding to the target harmony control in response to the triggering operation on the target harmony control includes:

starting a chord type control associated with the target harmony control to send corresponding prompt information, in response to the triggering operation on the target harmony control;

and determining, according to the prompt information, a chord type interval set corresponding to a control identifier of the chord type control as the target chord type interval set.

According to one or more embodiments of the present disclosure, the harmony processing method provided by the present disclosure further includes:

acquiring a background sound of a current scenario;

and mixing the first sound, the second sound, and the background sound for play.

According to one or more embodiments of the present disclosure, the harmony processing method provided by the present disclosure further includes:

detecting a volume of the first sound;

acquiring a rendering parameter of an application scenario according to the volume of the first sound;

and controlling the application scenario according to the rendering parameter.

According to one or more embodiments of the present disclosure, the harmony processing method provided by the present disclosure further includes:

pre-specifying a renderable region in the application scenario;

and controlling the application scenario according to the rendering parameter includes:

rendering in the renderable region according to the rendering parameter.

According to one or more embodiments of the present disclosure, the harmony processing method provided by the present disclosure further includes:

monitoring a character position in an application scenario;

and adjusting a sound source position of the second sound according to the character position.

According to one or more embodiments of the present disclosure, in the harmony processing method provided by the present disclosure, adjusting a sound source position of the second sound according to the character position includes:

determining sound parameter distribution conditions corresponding to different character positions according to a preset database;

and adjusting a volume of the second sound according to the sound parameter distribution conditions, to adjust the sound source position of the second sound.

According to one or more embodiments of the present disclosure, the harmony processing method provided by the present disclosure further includes:

presetting a plurality of harmony controls, in which the plurality of harmony controls correspond to different harmonic intervals;

and displaying indication information of different harmony effects on the plurality of harmony controls.

According to one or more embodiments of the present disclosure, the present disclosure provides a harmony processing apparatus, including:

a first acquiring module, configured to acquire a harmonic interval corresponding to a target harmony control in response to a triggering operation on the target harmony control;

a second acquiring module, configured to perform, according to the harmonic interval, sound modification processing on a first sound input originally to obtain a second sound, in which an interval between the first sound and the second sound is the harmonic interval;

and an audio generation module, configured to generate a target audio according to the first sound and the second sound, in which the first sound and the second sound are presented as different harmonic parts in the target audio.

According to one or more embodiments of the present disclosure, in the harmony processing apparatus provided by the present disclosure, the first acquiring module is specifically configured to:

query a preset correspondence between control identifiers and harmonic intervals to acquire a harmonic interval corresponding to a control identifier of the target harmony control, in response to the triggering operation on the target harmony control.

According to one or more embodiments of the present disclosure, in the harmony processing apparatus provided by the present disclosure, the first acquiring module is specifically configured to:

determine a target chord type interval set corresponding to the target harmony control in response to the triggering operation on the target harmony control;

query a preset correspondence between control identifiers and notes in the target chord type interval set, to acquire a target note corresponding to a control identifier of the target harmony control;

query the target chord type interval set, to acquire a harmony note corresponding to the target note;

and determine the harmonic interval corresponding to the target harmony control according to a note change between the target note and the harmony note.

According to one or more embodiments of the present disclosure, in the harmony processing apparatus provided by the present disclosure, the first acquiring module is specifically configured to:

query a preset correspondence between the control identifiers and chord types to determine a target chord type interval set corresponding to a control identifier of the target harmony control, in response to the triggering operation on the target harmony control.

According to one or more embodiments of the present disclosure, in the harmony processing apparatus provided by the present disclosure, the first acquiring module is specifically configured to:

start a chord type control associated with the target harmony control to send corresponding prompt information, in response to the triggering operation on the target harmony control;

determine, according to the prompt information, a chord type interval set corresponding to a control identifier of the chord type control as the target chord type interval set.

According to one or more embodiments of the present disclosure, the harmony processing apparatus provided by the present disclosure further includes:

a third acquiring module, configured to acquire a background sound of a current scenario;

and the audio generation module is further configured to mix the first sound, the second sound, and the background sound for play.

According to one or more embodiments of the present disclosure, the harmony processing apparatus provided by the present disclosure further includes:

a detection module, configured to detect a volume of the first sound;

a fourth acquiring module, configured to acquire a rendering parameter of an application scenario according to the volume of the first sound;

and a control module, configured to control the application scenario according to the rendering parameter.

According to one or more embodiments of the present disclosure, the harmony processing apparatus provided by the present disclosure further includes:

a specification module, configured to pre-specify a renderable region in the application scenario;

and the control module is further configured to render in the renderable region according to the rendering parameter.

According to one or more embodiments of the present disclosure, the harmony processing apparatus provided by the present disclosure further includes:

a monitoring module, configured to monitor a character position in an application scenario;

and an adjustment module, configured to adjust a sound source position of the second sound according to the character position.

According to one or more embodiments of the present disclosure, in the harmony processing apparatus provided by the present disclosure, the adjustment module is further configured to: determine sound parameter distribution conditions corresponding to different character positions according to a preset database; and adjust a volume of the second sound according to the sound parameter distribution conditions, to adjust the sound source position of the second sound.

According to one or more embodiments of the present disclosure, the harmony processing apparatus provided by the present disclosure further includes:

a presetting module, configured to presetting a plurality of harmony controls, wherein the plurality of harmony controls correspond to different harmonic intervals;

and a display module, configured to display indication information of different harmony effects on the plurality of harmony controls.

According to one or more embodiments of the present disclosure, the present disclosure provides an electronic device, including:

a processor;

and a memory, configured to store instructions that can be executed by the processor;

and the processor is configured to read the executable instructions from the memory, and execute the instructions to implement any harmony processing method provided by the present disclosure.

According to one or more embodiments of the present disclosure, the present disclosure provides a computer-readable storage medium, the storage medium stores a computer program, and the computer program is used to perform any harmony processing method provided by the present disclosure.

The above descriptions are merely preferred embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

The invention claimed is:

1. A harmony processing method, comprising:

acquiring a first sound input originally from a sound source;

acquiring a harmonic interval corresponding to a target harmony control in response to a triggering operation on the target harmony control;

performing, according to the harmonic interval, sound modification processing on the first sound to obtain a second sound, wherein an interval between the first sound and the second sound is the harmonic interval; and generating a target audio according to the first sound and the second sound, wherein the first sound and the second sound are presented as different harmonic parts in the target audio.

2. The method according to claim 1, wherein acquiring a harmonic interval corresponding to a target harmony control in response to a triggering operation on the target harmony control comprises:
   querying a preset correspondence between control identifiers and harmonic intervals to acquire a harmonic interval corresponding to a control identifier of the target harmony control, in response to the triggering operation on the target harmony control.

3. The method according to claim 1, wherein acquiring a harmonic interval corresponding to a target harmony control in response to a triggering operation on the target harmony control comprises:
   determining a target chord type interval set corresponding to the target harmony control in response to the triggering operation on the target harmony control;
   querying a preset correspondence between control identifiers and notes in the target chord type interval set, to acquire a target note corresponding to a control identifier of the target harmony control;
   querying the target chord type interval set, to acquire a harmony note corresponding to the target note; and
   determining the harmonic interval corresponding to the target harmony control according to a note change between the target note and the harmony note.

4. The method according to claim 3, wherein determining a target chord type interval set corresponding to the target harmony control in response to the triggering operation on the target harmony control comprises:
   querying a preset correspondence between the control identifiers and chord types to determine a target chord type interval set corresponding to a control identifier of the target harmony control, in response to the triggering operation on the target harmony control.

5. The method according to claim 3, wherein determining a target chord type interval set corresponding to the target harmony control in response to the triggering operation on the target harmony control comprises:
   starting a chord type control associated with the target harmony control to send corresponding prompt information, in response to the triggering operation on the target harmony control; and
   determining, according to the prompt information, a chord type interval set corresponding to a control identifier of the chord type control as the target chord type interval set.

6. The method according to claim 1, further comprising:
   acquiring a background sound of a current scenario; and
   mixing the first sound, the second sound, and the background sound for play.

7. The method according to claim 1, further comprising:
   detecting a volume of the first sound;
   acquiring a rendering parameter of an application scenario according to the volume of the first sound; and
   controlling the application scenario according to the rendering parameter.

8. The method according to claim 2, further comprising:
   detecting a volume of the first sound;
   acquiring a rendering parameter of an application scenario according to the volume of the first sound; and
   controlling the application scenario according to the rendering parameter.

9. The method according to claim 3, further comprising:
   detecting a volume of the first sound;
   acquiring a rendering parameter of an application scenario according to the volume of the first sound; and
   controlling the application scenario according to the rendering parameter.

10. The method according to claim 6, further comprising:
    detecting a volume of the first sound;
    acquiring a rendering parameter of an application scenario according to the volume of the first sound; and
    controlling the application scenario according to the rendering parameter.

11. The method according to claim 7, further comprising:
    pre-specifying a renderable region in the application scenario; and
    controlling the application scenario according to the rendering parameter comprises:
    rendering in the renderable region according to the rendering parameter.

12. The method according to claim 1, further comprising:
    monitoring a character position in an application scenario; and
    adjusting a sound source position of the second sound according to the character position.

13. The method according to claim 2, further comprising:
    monitoring a character position in an application scenario; and
    adjusting a sound source position of the second sound according to the character position.

14. The method according to claim 3, further comprising:
    monitoring a character position in an application scenario; and
    adjusting a sound source position of the second sound according to the character position.

15. The method according to claim 6, further comprising:
    monitoring a character position in an application scenario; and
    adjusting a sound source position of the second sound according to the character position.

16. The method according to claim 12, wherein adjusting a sound source position of the second sound according to the character position comprises:
    determining sound parameter distribution conditions corresponding to different character positions according to a preset database; and
    adjusting a volume of the second sound according to the sound parameter distribution conditions, to adjust the sound source position of the second sound.

17. The method according to claim 1, further comprising:
    presetting a plurality of harmony controls, wherein the plurality of harmony controls correspond to different harmonic intervals; and
    displaying indication information of different harmony effects on the plurality of harmony controls.

18. The method according to claim 2, further comprising:
    presetting a plurality of harmony controls, wherein the plurality of harmony controls correspond to different harmonic intervals; and
    displaying indication information of different harmony effects on the plurality of harmony controls.

19. An electronic device, wherein the electronic device comprises:
    a processor, and
    a memory, configured to store instructions that can be executed by the processor,
    wherein the processor is configured to read the instructions from the memory, and execute the instructions to implement the harmony processing method according to claim 1.

20. A non-transitory computer-readable storage medium, storing a computer program, wherein the computer program is used to perform the harmony processing method according to claim 1.

* * * * *